US007394475B2

(12) United States Patent
Bradley et al.

(10) Patent No.: US 7,394,475 B2
(45) Date of Patent: Jul. 1, 2008

(54) APPARATUS, SYSTEM, AND METHOD FOR IMAGE REGISTRATION

(75) Inventors: Timothy G. Bradley, Longmont, CO (US); Robert J. Firmature, Northglenn, CO (US)

(73) Assignee: Infoprint Solutions Company, LLC, Boulder, CO (US)

( * ) Notice: Subject to any disclaimer, the term of this patent is extended or adjusted under 35 U.S.C. 154(b) by 358 days.

(21) Appl. No.: 10/778,764

(22) Filed: Feb. 13, 2004

(65) Prior Publication Data

US 2005/0179770 A1 Aug. 18, 2005

(51) Int. Cl.
*B41J 2/385* (2006.01)
*B41J 2/435* (2006.01)
*G01D 15/06* (2006.01)

(52) U.S. Cl. ........................ 347/116; 347/248; 347/224; 347/262

(58) Field of Classification Search ................. 347/116, 347/900, 224–264; 399/301, 15, 66, 159, 399/162, 302–303, 308
See application file for complete search history.

(56) References Cited

U.S. PATENT DOCUMENTS 5,266,976 A * 11/1993 Ohigashi et al. ............ 347/116
5,302,973 A * 4/1994 Costanza et al. ............ 347/233
5,418,556 A * 5/1995 Andrews ..................... 346/116
5,488,458 A 1/1996 Benedict et al. ............. 355/206
5,778,280 A * 7/1998 Komiya et al. ................ 399/49
6,147,087 A 11/2000 Urbahns et al. ............. 514/299
6,219,517 B1 4/2001 Takahashi et al. ........... 399/301
6,344,644 B1 * 2/2002 Minakuchi .................. 250/234
6,371,592 B1 4/2002 Otsuka et al. ................. 347/19
6,474,767 B1 11/2002 Teshigawara et al. ......... 347/19
2005/0093956 A1 * 5/2005 Egan .......................... 347/171

* cited by examiner

*Primary Examiner*—Hai C Pham
*Assistant Examiner*—Kainoa B Wright
(74) *Attorney, Agent, or Firm*—Duft Bornsen & Fishman, LLP

(57) ABSTRACT

An apparatus, system and method of print registration are provided. The invention includes first and second optical channel modules configured to communicate light from a page to a sensor module. The sensor module sums the light from the first and second optical channel modules and detects one or more light transitions as a first registration mark of a first image of the page moves past the first optical sensor module and as a second registration mark of a second image of the page moves past the second optical channel module. The invention determines that the first image and the second image are registered if the sensor module detects a single light transition as the first registration mark and the second registration mark pass the first and the second optical channel modules. In addition, the invention determines that the first image and the second image are mis-registered if the sensor module detects a plurality of light transitions as the first registration mark and the second registration mark pass the first and the second optical channel modules.

16 Claims, 5 Drawing Sheets

APPARATUS, SYSTEM, AND METHOD FOR IMAGE REGISTRATION

BACKGROUND OF THE INVENTION

1. Field of the Invention

This invention relates to print registration and more particularly relates to image registration with a single optical sensor.

2. Description of the Related Art

Printing systems such as duplex image printing systems and color image printing systems often register two or more separate images on one or two sides of a page. The page may be paper, a printed form, a continuous feed printed form, or a carton. Registration involves aligning each image in a desired position relative to each other image or images. Images are mis-registered when one or more images are not aligned as desired relative to the other images.

For example, a duplex printing system prints a first image on the anterior side of a page and a second image on the posterior side of the page. The first image and the second image are considered to be registered if they are aligned relative to each other so that the first image and the second image occupy equivalent areas on the anterior and posterior sides of the paper. When printing color images, the color separated images are deemed to be properly registered when two or more of the color separated images are aligned relative to each other on one side of the page.

Current printing systems often employ registration marks to align the two or more images. FIG. 1 depicts a registration mark system 100 of the current practice. A page 105 is imprinted with a first registration mark 110. In a certain embodiment, the first registration mark 110 is part of an image. The first registration mark 110 may also be preprinted on a single sheet form, preprinted on a continuous feed form, or be a physical characteristic of the page 105. In addition, the first registration mark 110 may be printed on the anterior side of the page 105 and a second registration mark (not shown) may be printed on the posterior side (not shown) of the page 105. Alternately, a color registration mark 105 may be printed for each color separated image of a color image printed on one side of the page 105.

FIG. 2 illustrates a registration detection device 200 of the current practice. The registration detection device 200 includes two optical sensors 205. A paper transport module (not shown) moves the page 105 with the first registration mark 110 of a first image past the first optical sensor 205*a* and the second registration mark (not shown) of a second image past the second optical sensor 205*b*. When the first registration mark 110 is in the same position relative to the first optical sensor 205*a* as the position of the second registration mark relative to the second optical sensor 205*b*, the first image and the second image are considered to be registered.

In Operation, the first optical sensor 205*a* detects the first registration mark 110, and the second optical sensor 205*b* detects the second registration mark. A logic module (not shown) measures the time interval between the detection of the first registration mark 110 and the second registration mark. If the time interval is smaller than a specified limit, the first image and the second image are considered to be registered. If the time interval is larger than the specified limit, the first image and the second image are considered to be mis-registered.

It is a drawback of such a system that the registration detection device 200 must include at least two optical sensors to register the images on the page 105. In addition, the registration detection device 200 requires that the logic module have sufficient sophistication to measure the time interval between the each instance when each optical sensor 205 detects a registration mark 110. Two optical sensors and the sophisticated logic increase the cost of the registration detection device 200.

What is needed is a process, apparatus, and system that detects image registration with a single optical sensor. Beneficially, such a process, apparatus, and system would reduce the cost of a registration detection device.

SUMMARY OF THE INVENTION

The present invention has been developed in response to the present state of the art, and in particular, in response to the problems and needs in the art that have not yet been fully solved by currently available image registration devices. Accordingly, the present invention has been developed to provide a process, apparatus, and system for image registration that overcome many or all of the above-discussed shortcomings in the art.

The apparatus for image registration contains a plurality of modules configured to functionally execute the necessary steps of receiving light through a first and a second optical channel module, summing the light, and detecting a light transition. These modules in the described embodiments include the first optical channel module, the second optical channel module, and a sensor module.

The first optical channel module receives light from a first image on a page. The second optical channel module receives light from a second image on the page. In a certain embodiment, the first and second optical channel modules are fiber optic cables. In one embodiment, the first image and the second image are on the same side of the page. In an alternate embodiment, the first image and the second image are on opposite sides of the page.

The sensor module receives and sums the light from the first and second channel modules. The sensor module detects a first light transition as a first registration mark of the first image passes the first optical channel module. In addition, the sensor module detects a second light transition as a second registration mark of the second image passes the second optical channel module. In one embodiment, if the first registration mark and the second registration mark are registered, the sensor module detects the first light transition and the second light transition as a single light transition. In an alternate embodiment, if the first registration mark and the second registration mark are mis-registered, the sensor module detects the first light transition and the second light transition as two light transitions.

In a further embodiment, the apparatus includes a control module to adjust the relative position of the first image and the second image in response to the mis-registration. In one embodiment, the control module positions the first image and the second image to specified positions on the page. The control module may adjust the first image position in response to detecting the mis-registration and detect for registration. If the images are mis-registered, the control module may repeatedly adjust the first image position and detect for registration until the first image and the second image are registered. In an alternate embodiment, the control module further includes a timing module configured to measure the time interval between the first light transition and the second light transition. The control module may adjust the position of the first image in response to the measured time interval.

A system of the present invention is also presented for image registration. The system may be embodied in a printer.

In particular, the system, in one embodiment, includes a paper transport module, a first optical channel module, a second optical channel module, and a sensor module.

The paper transport module moves a first registration mark of a first image on a page past the first optical channel module and further moves a second registration mark of a second image on the page past the second optical channel module. The first optical channel module receives light from the first registration mark and the second optical channel module also receives light from the second registration mark. The sensor module receives and sums the light from the first and second channel modules. The sensor module detects a first light transition as the first registration mark moves past the first optical channel module. In addition, the sensor module detects a second light transition as the second registration mark moves past the second optical channel module.

In one embodiment, if the first registration mark and the second registration mark are registered, the sensor module detects the first light transition and the second light transition as a single light transition. In addition, if the first registration mark and the second registration mark are mis-registered, the sensor module detects the first light transition and the second light transition as two light transitions. The system may further include a control module. The control module may adjust the position of the first image and the second image to register the images in response to a mis-registration.

A process of the present invention is also presented for image registration. The process in the disclosed embodiments substantially includes the steps necessary to carry out the functions presented above with respect to the operation of the described apparatus and system. In one embodiment, the process includes receiving light from a first and second image through a first and a second optical channel module, summing the light, and detecting a light transition. The process may also include adjusting image position and determining if the first image and the second image are registered.

In one embodiment, the process adjusts the position of the first image and the second image to specified positions. The process further receives light from the first image through the first optical channel module and from the second image through the second optical channel module. In addition, the process sums the light from the first optical channel module and the second optical channel module and detects a light transition.

In a further embodiment, the process detects the light transition as a first registration mark of the first image and a second registration mark of the second image move past the optical channel modules. The process determines that the first registration mark and the second registration mark are registered if the process detects one light transition. In addition, the process determines that the first and the second registration mark are mis-registered if the process detects two or more light transitions. In one embodiment, the process further positions the first image to in response to the mis-registration and detects for one or more light transitions to determine if the first and the second image are mis-registered.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention uses a single sensor module to detect the registration and mis-registration of a plurality of registration marks. The present invention may consequently reduce the cost of a registration detection device. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
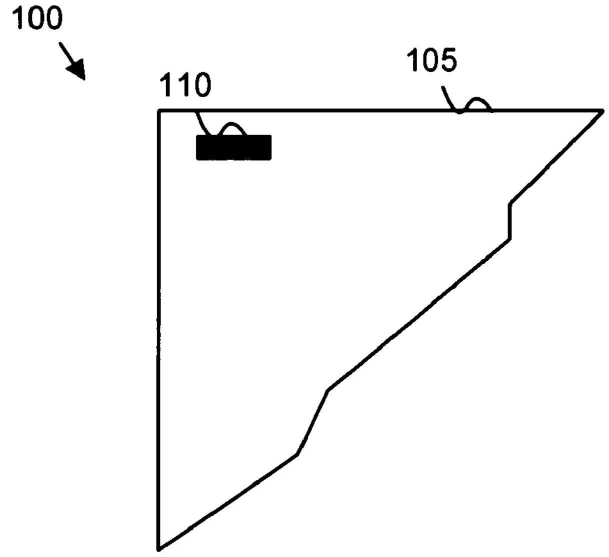
(Prior Art) FIG. 1
FIG. 1 illustrates a registration mark system of the current practice.
Figure 2:
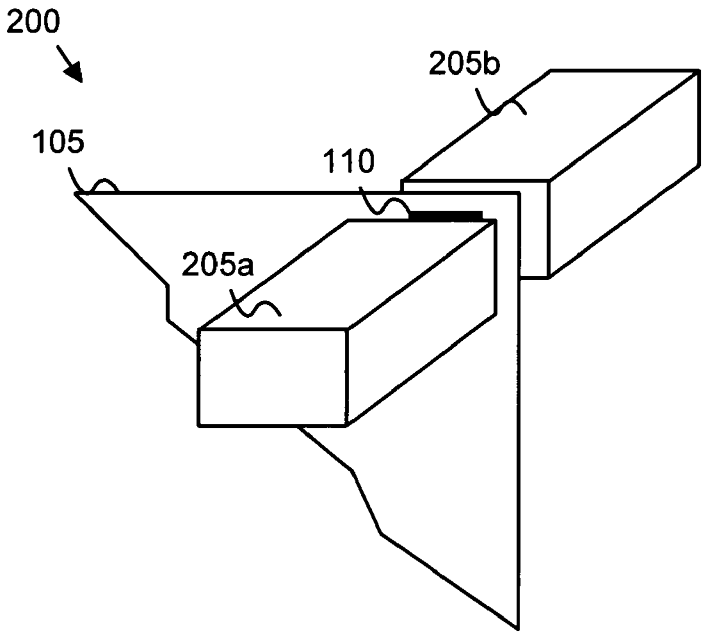
(Prior Art) FIG. 2
FIG. 2 illustrates a registration detection device of the current practice.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 3:
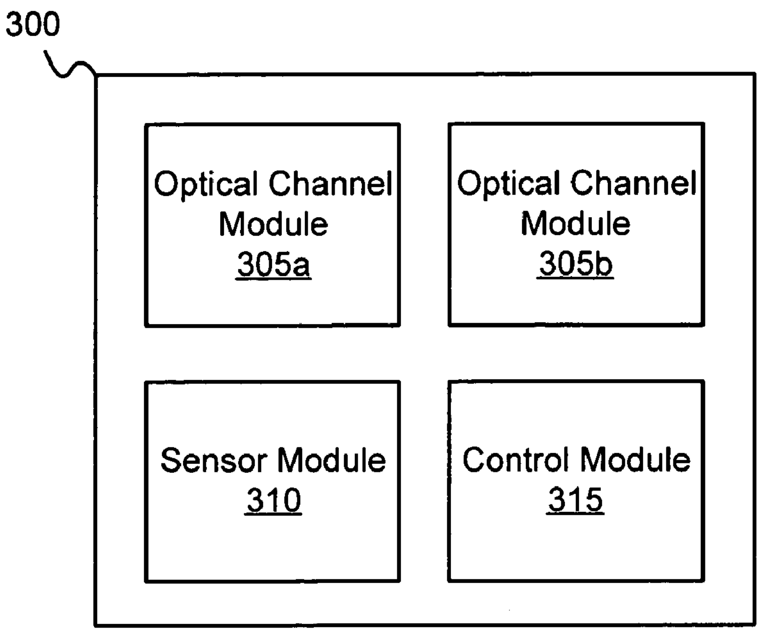
FIG. 3 illustrates one embodiment of a registration detection device in accordance with the present invention.

FIG. 3 illustrates one embodiment of a registration detection device 300 in accordance with the present invention. The registration detection device 300 maybe used to detect the registration and mis-registration of a plurality of registration marks 110. The registration detection device 300 includes two or more optical channel modules 305, and a sensor module 310. In one embodiment, the registration detection device 300 further includes a control module 315. Although for this discussion, two optical channel modules 305 are depicted, more optical channel modules 305 may be employed.

The first optical channel module 305*a* receives light reflected from a first image on a page 105 (not shown). The second optical channel module 305*b* also receives light reflected from a second image on the page 105. In a certain embodiment, the first and second images are printed on the page 105. In one embodiment, the first image and the second image are on the same side of the page 105. In an alternate embodiment, the first image and the second image are on opposite sides of the page 105. The optical channel modules 305 carry the light that is reflected by the images and the page 105. In a certain embodiment, the images are illuminated by one or more light sources (not shown). In one embodiment, the first and second optical channel modules 305 are fiber optic guides. In a certain embodiment, the optical modules 305 are F-S-72R fiber optic guides manufactured by the Tri-Tronics Company, Inc. of Tampa, Fla.

The optical channel modules 305 communicate the light to the sensor module 310. In a certain embodiment, the sensor module 310 is a Mark•Eye sensor manufactured by the Tri-Tronics Company, Inc. of Tampa, Fla. The sensor module 310 detects a first light transition as a first registration mark 110 of the first image moves past the first optical channel module 305*a*. In addition, the sensor module 310 also detects a second light transition as a second registration mark 110 of the second image passes the second optical channel module 305*b*. If the first registration mark 110 and the second registration mark 110 are registered, the sensor module 310 detects the first light transition and the second light transition as one single light transition. The sensor module 310 may communicate the registration. In addition, if the first registration mark 110 and the second registration mark 110 are mis-registered, the sensor module 310 detects the first light transition and the second light transition as at least two light transitions. The sensor module 310 may communicate the mis-registration.

In one embodiment, the registration detection device 300 includes a control module 315. The control module 315 adjusts the relative position of the first image and the second image in response to a mis-registration. The control module 315 may position the first image and the second image to specified positions on the page 105. In addition, the control module 315 may adjust the first image position in response to detecting the mis-registration and again detecting for registration. If the images are mis-registered, the control module 315 may repeat adjusting the first image position and detecting for registration until the first image and the second image are registered. The registration detection device 300 detects the registration and mis-registration of a plurality of registration marks 110.

Figure 4:
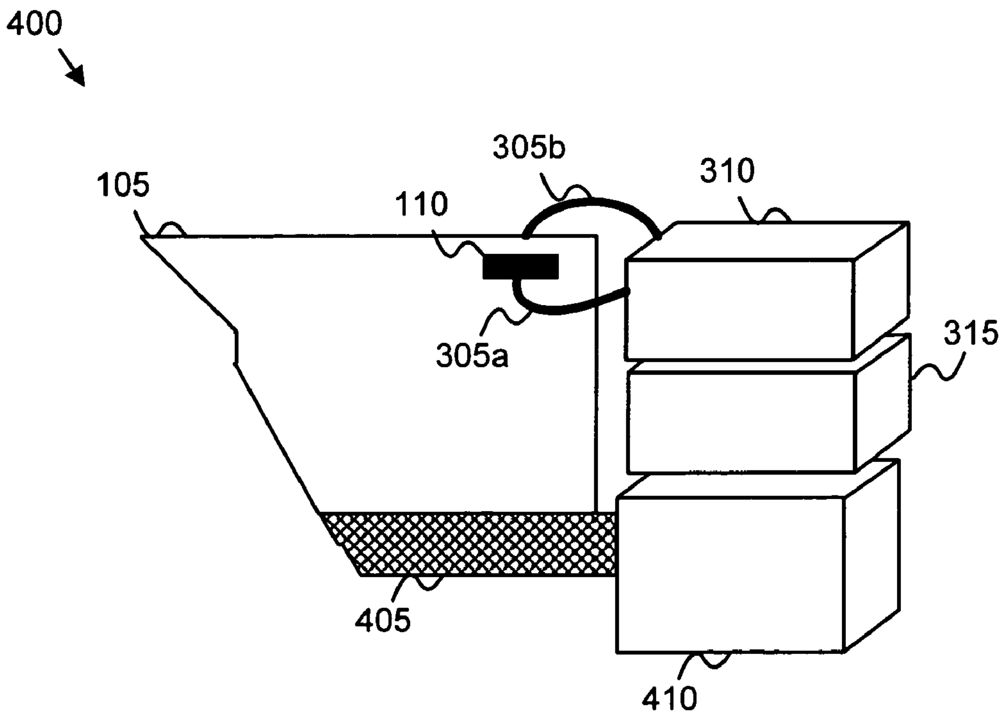
FIG. 4 illustrates one embodiment of a registration detection system of the present invention.

FIG. 4 illustrates one embodiment of a registration detection system 400 of the present invention. The registration detection system 400 includes the modules of the registration detection device 300 and a paper transport module 405. The page 105 and the registration mark 110 are also depicted. The registration detection system 400 positions a plurality of registration marks 110 and detects registration and mis-registration.

The paper transport module 405 moves one or more registration marks 110 on the page 105 past the first optical channel module 305*a* and the second optical channel module 305*a*. In one embodiment, the registration detection system 400 triggers the sensor module 310 to detect one or more light transitions as the paper transport module 405 moves the registration marks 110 past the optical channel modules 305. In a certain embodiment, the control module 315 triggers the sensor module 310 to detect the one or more light transitions. In one embodiment, the paper transport module 405 is driven by a stepper motor 410. The registration detection system 400 detects registration or mis-registration using the registration marks 110 on the page 105 positioned by paper transport module 405.

Figure 5:
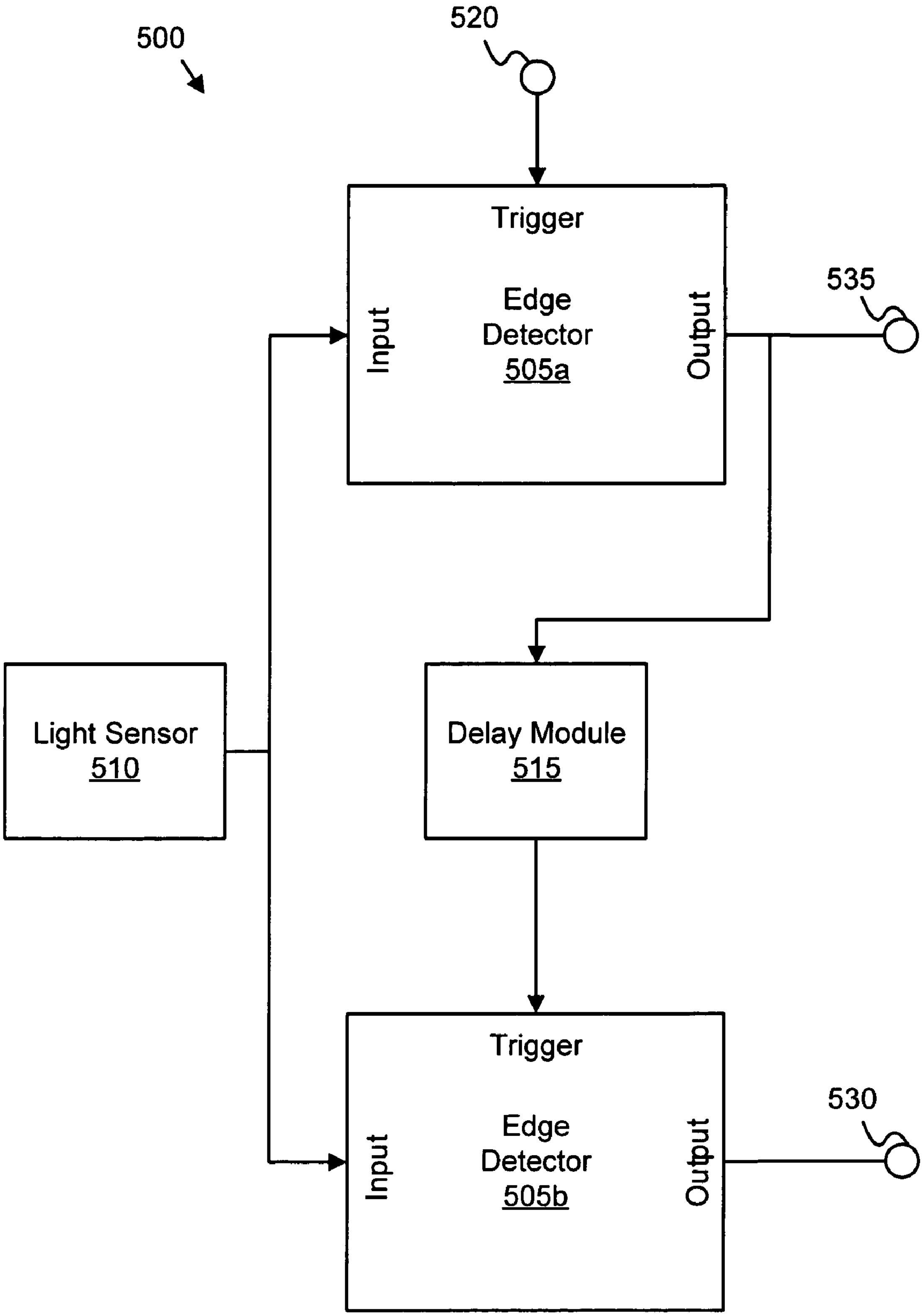
FIG. 5 is a schematic of one embodiment of a light transition detection circuit 500 of the present invention.

FIG. 5 is a schematic of one embodiment of a light transition detection circuit ("LTDC") 500 of the present invention. The LTDC 500 as depicted detects one or two light transitions. In one embodiment, the LTDC 500 is the sensor module of FIG. 3 and FIG. 4. The LTDC 500 includes one or more edge detectors 505, a light sensor 510, a delay module 515, a trigger input 520, and a mis-registration output 530. In one embodiment, the LTDC 500 also includes a transition captured output 535. Although for discussion purposes the LTDC 500 is depicted with two edge detectors 505 and one delay module 515, two or more edge detectors 505 and one or more delay modules 515 may be employed.

The edge detector 505 is configured to detect a voltage level transition or edge at the input of the edge detector 505 if the trigger of the edge detector 505 is asserted. In addition, the edge detector 505 remains asserted until reset. The LTDC 500 receives a trigger signal at the trigger input 520. The trigger signal enables the first edge detector 505*a* to detect a voltage level transition at the input of the first edge detector 505*a*. In one embodiment, the trigger signal is received prior to the registration marks 110 of the page 105 moving past the optical channel modules 305. The light sensor 510 converts the light received from the first and second optical channel module 305 into a voltage. The voltage from the light sensor 510 is received by the inputs of the edge detectors 505.

In one embodiment, as the optical channel module 305 transitions from receiving reflected light from the unprinted page 105 to receiving reflected light from the printed registration mark 110, the intensity of the light communicated to the light sensor 510 is reduced. In response to the reduced light intensity, the voltage output by the light sensor 510 is reduced. The first edge detector 505*a* detects a first voltage level transition if the trigger signal is asserted and asserts the first edge detector 505*a* output. In one embodiment, the transition captured output 535 is asserted if the first edge detector 505*a* output is asserted, indicating that at least one registration mark 110 is detected.

The asserted output of the first edge detector 505*a* is delayed by the delay module 515 and asserts the trigger of the second edge detector 505*b*. The delay module 515 delays enabling the second edge detector 505*b* so that the second edge detector 505*b* does not detect the first voltage transition detected by the first edge detector 505*a*. The second edge detector 505*b* detects a second voltage transition subsequent to the first edge detector 505*a* detecting the first voltage transition. If the second edge detector 505*b* detects the second voltage transition when the second edge detector 505*b* trigger is enabled, the mis-registration output 530 is asserted, indicating the mis-registration of the first and the second registration marks 110. In one embodiment, the edge detector 505 output is reset when the edge detector 505 trigger input is de-asserted. The LTDC 500 detects one light transition indicating registration of the registration marks 110 or alternatively two or more light transitions indicating mis-registration of the registration marks 110.

Figure 6:
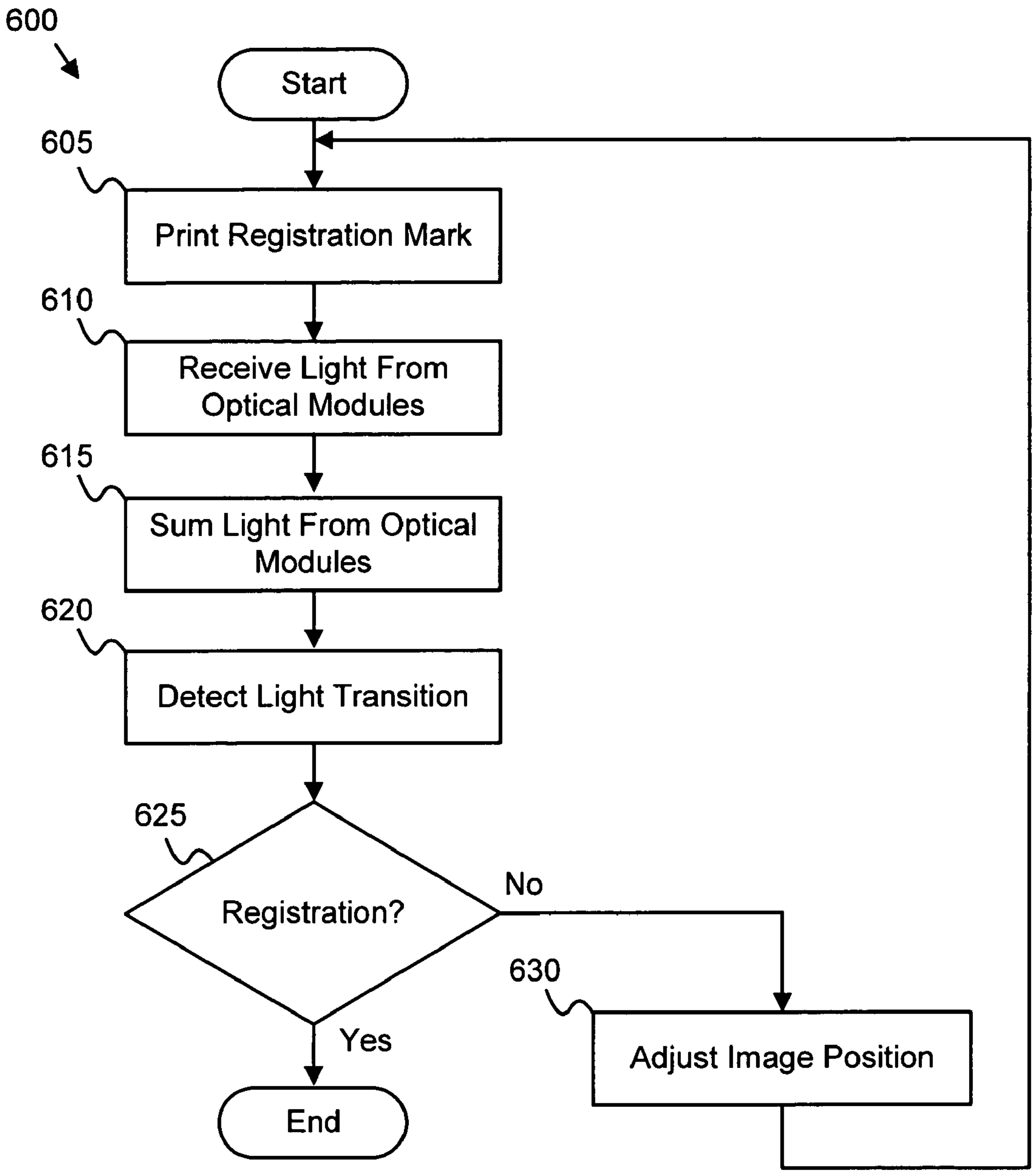
FIG. 6 is a flow chart diagram illustrating one embodiment of a registration detection process in accordance with the present invention.

FIG. 6 is a flow chart diagram illustrating one embodiment of a registration detection process ("RDP") 600 in accordance with the present invention. Although for purposes of clarity the RDP 600 is depicted in a certain sequential order, execution may be conducted in parallel and not necessarily in the depicted order.

In one embodiment, the RDP 600 prints 605 one or more registration marks 110 on the page 105. In an alternate embodiment, one or more registration marks 110 are preprinted on the page 105. The RDP 600 receives 610 light from one or more optical channel modules 305 as the registration marks 110 pass the optical channel modules 305. In one embodiment, the RDP 600 receives 610 light from at least one optical channel module 305 for each registration mark 110. The RDP 600 further sums 615 the light from each optical channel module 305.

The RDP 600 detects 620 at least one light transition and determines 625 if the registration marks of the first and the second images are registered. The RDP 600 determines 625 the registration marks 110 are registered if the RDP 600 detects 620 one light transition. In addition, the RDP 600 determines 625 the registration marks 110 are mis-registered if the RDP detects 620 two or more light transitions. In a certain embodiment, the RDP 600 determines 625 if three or more images are registered.

The RDP 600 loops to adjust 630 the image position if the RDP 600 determines 625 that the registration marks 110 are mis-registered. In one embodiment, the RDP 600 adjusts 630 the first image position. In an alternate embodiment, the RDP 600 adjusts 630 the first image position and the second image position. In addition, the RDP 600 terminates if the RDP 600 determines 625 the registration marks 110 are registered. The RDP 600 detects the registration of the registration marks 110 of two or more images.

Figure 7:
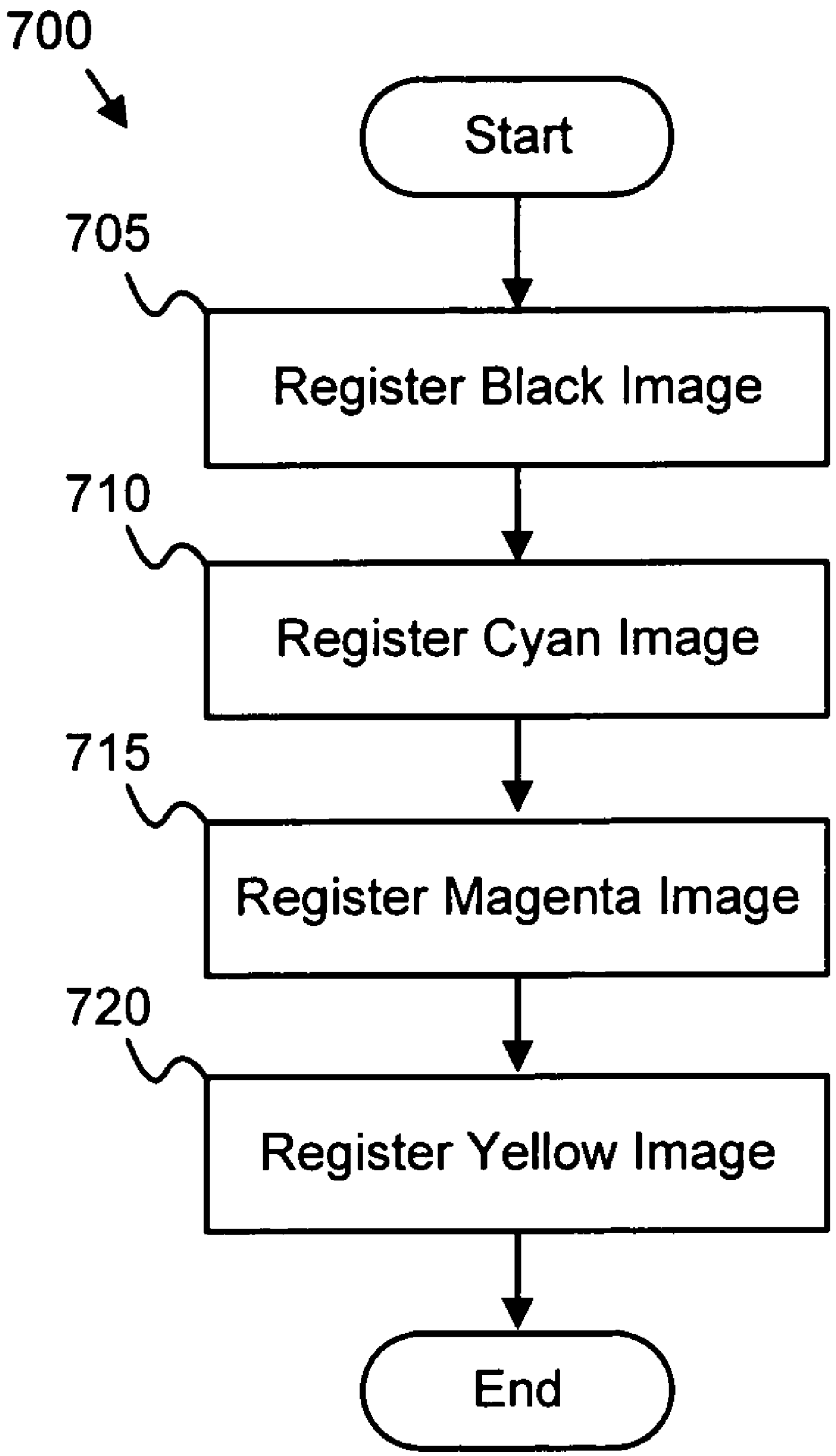
FIG. 7 is a flow chart diagram illustrating one embodiment of a color registration detection process in accordance with the present invention.

FIG. 7 is a flow chart diagram illustrating one embodiment of a color registration detection process ("CRDP") 700 in accordance with the present invention. The CRDP 700 detects registration and mis-registration for four-color images on one side of a page 105. Although for purposes of clarity the CRDP 700 is depicted in a certain sequential order, execution may be conducted in parallel and not necessarily in the depicted order. In addition, although the CRDP 700 is shown detecting registration and mis-registration for black, cyan, magenta, and yellow color separated images, any number of color separated images and any combination of colors may be employed.

In one embodiment, the CRDP 700 registers 705 a black color separated image. The CRDP 700 may employ the RDP 600 of FIG. 6 to register a black registration mark 110 of the black color separated image with a second registration mark 110. The second registration mark 110 may be a physical characteristic of the page 105. In a certain embodiment, the second registration mark 110 is preprinted on the page 105. In an alternate embodiment, the black registration mark 110 is printed on the anterior side of the page 105 and the second registration mark 110 is printed on the posterior side of the page.

In one embodiment, the CRDP 700 registers 710 a cyan color separated image. The CDRP 700 may register 710 the cyan color separated image using the RDP 600 depicted in FIG. 6. In a certain embodiment, the CDRP 700 registers a cyan registration mark 110 with the black registration mark 110.

In addition, the CRDP 700 registers 715 a magenta color separated image and registers 720 a yellow color separated image. In one embodiment, the magenta color separated image and the yellow color separated image are registered using the RDP 600 of FIG. 6. The CRDP 700 may register 715 a magenta registration mark with the black registration mark 110 and also may register 720 a yellow registration mark with the black registration mark 110. The CDRP 700 detects registered color separated images by detecting registered and mis-registered registration marks 110.

The present invention uses a single sensor module 310 to detect the registration and mis-registration of a plurality of registration marks 110. The present invention may further reduce the cost of a registration detection device 300. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for image registration, the apparatus comprising:

a first optical channel module configured to communicate light from a first image on a paper;

a second optical channel module configured to communicate light from a second image on the paper; and a sensor module configured to receive light from the first optical channel and the second optical channel simultaneously, and to derive a signal based on the combined intensity of the light from the first optical channel and the light from the second optical channel, and to detect a light transition based on the signal in order to detect a registration, wherein the sensor module is configured to detect the registration by detecting the light transition as a first registration mark of the first image passes the first optical channel module and as a second registration mark of the second image passes the second optical channel module, wherein the registration marks are duplex page registration marks, wherein the sensor module is configured to determine a mis-registration has occurred upon detecting a plurality of light transitions when the first registration mark passes the first optical channel module and the second registration mark passes the second optical channel module, wherein the first optical channel module is configured to communicate light from the anterior side of the page and the second optical channel module is configured to communicate light from the posterior side of the page and wherein the sensor module comprises a single sensor, and wherein the sensor module further comprises:

a light sensor circuit coupled to receive the combined intensity of the light from the first optical channel and the light from the second optical channel and adapted to generate a voltage level indicative of the combined intensity;

a first edge detector circuit coupled to receive the voltage level and adapted to detect a first transition in the voltage level and adapted to generate a delay enable signal responsive to sensing the first transition;

a delay circuit coupled to receive the delay enable signal and adapted to generate a delayed trigger signal after a predetermined period of time following the sensing of the generation of the delay enable signal; and a second edge detector circuit coupled to receive the delayed trigger signal and coupled to receive the voltage level and adapted to generate a mis-registration output signal to detect the mis-registration if a second transition in the voltage level is sensed following reception of the delayed trigger signal.

2. The apparatus of claim 1, wherein the registration marks are color registration marks.

3. The apparatus of claim 1, further comprising a control module configured to adjust the position of the first image in response to the mis-registration.

4. The apparatus of claim 3, wherein the control module is further configured to adjusts the position of the first image from a specified initial position.

5. The apparatus of claim 3, the control module further comprising a timing module configured to measure the time interval between a first light transition and a second light transition.

6. The apparatus of claim 5, wherein the control module is further configured to calculate an adjustment to the position of the first image based at least partially upon the time interval.

7. A system for image registration, the system comprising:

a paper transport module configured to move a page;

a first optical channel module configured to communicate light from a first image on the page;

a second optical channel module configured to communicate light from a second image on the page; and a sensor module configured to receive light from the first optical channel and the second optical channel simultaneously, and to derive a signal based on the combined intensity of the light from the first optical channel and the light from the second optical channel, and to detect a light transition based on the signal in order to detect a registration, wherein the sensor module is configured to detect the registration by detecting the light transition as the paper transport module moves a first registration mark of the first image past the first optical channel module and a second registration mark of the second image past the second optical channel module, wherein the registration marks are duplex page registration marks, wherein the sensor module is configured to detect a mis-registration by detecting a plurality of light transitions as the paper transport module moves the page with the first registration mark past the first optical channel module and the second registration mark past the second optical channel module, wherein the first optical channel module is configured to communicate light from the anterior side of the page and the second optical channel module is configured to communicate light from the posterior side of the page, and wherein the sensor module further comprises:

a light sensor circuit coupled to receive the combined intensity of the light from the first optical channel and the light from the second optical channel and adapted to generate a voltage level indicative of the combined intensity;

a first edge detector circuit coupled to receive the voltage level and adapted to detect a first transition in the voltage level and adapted to generate a delay enable signal responsive to sensing the first transition;

a delay circuit coupled to receive the delay enable signal and adapted to generate a delayed trigger signal after a predetermined period of time following the sensing of the generation of the delay enable signal; and a second edge detector circuit coupled to receive the delayed trigger signal and coupled to receive the voltage level and adapted to generate a mis-registration output signal to detect the mis-registration if a second transition in the voltage level is sensed following reception of the delayed trigger signal.

8. The system of claim 7, wherein the registration marks are color registration marks.

9. The system of claim 7, further comprising a control module configured to adjust the position of the first image in response to the mis-registration.

10. The system of claim 9, further comprising a control module configured to adjust the position of the first image from a specified initial position.

11. A computer readable storage medium comprising computer readable code configured to carry out a method for image registration, the method comprising:

receiving light from a first image through a first optical channel module and from a second image through a second optical channel module simultaneously;

deriving a signal based on the combined intensity of the light from the first optical channel and the light from the second optical channel;

detecting a first light transition of the signal;

issuing a delayed trigger signal based on the first light transition;

attempting to detect a second light transition of the signal based on the delayed trigger signal;

determining the registration by detecting the first light transition as a first registration mark of the first image passes the first optical channel module and as a second registration mark of the second image passes the second optical channel module wherein the registration marks are duplex page registration marks and by failing to detect said second light transition;

determining a mis-registration by detecting the first light transition as the first registration mark passes the first optical channel module and by detecting said second light transition as the second registration mark passes the second optical channel module.

12. The computer readable storage medium of claim 11, wherein the registration marks are color registration marks.

13. The computer readable storage medium of claim 11, wherein the method further comprises adjusting the first image position responsive to the mis-registration.

14. The computer readable storage medium of claim 13, wherein the method further comprises adjusting the position of the first image from a specified initial position.

15. The computer readable storage medium of claim 13, wherein the method further comprises measuring the time interval between a first light transition and a second light transition and adjusting the image responsive to the time interval.

16. A method for page registration, the method comprising:

receiving light from a first image through a first optical channel module and from a second image through a second optical channel module simultaneously;

deriving a signal based on the combined intensity of the light from the first optical channel and the light from the second optical channel;

detecting a first light transition of the signal;

issuing a delayed trigger signal based on the first light transition;

attempting to detect a second light transition of the signal based on the delayed trigger signal;

determining the registration by detecting the first light transition as a first registration mark of the first image passes the first optical channel module and as a second registration mark of the second image passes the second optical channel module wherein the registration marks are duplex page registration marks and by failing to detect said second light transition;

determining a mis-registration by detecting the first light transition as the first registration mark passes the first optical channel module and by detecting said second light transition as the second registration mark passes the second optical channel module.

* * * * *

UNITED STATES PATENT AND TRADEMARK OFFICE

CERTIFICATE OF CORRECTION

PATENT NO. : 7,394,475 B2
APPLICATION NO. : 10/778764
DATED : July 1, 2008
INVENTOR(S) : Bradley et al.

It is certified that error appears in the above-identified patent and that said Letters Patent is hereby corrected as shown below:

At column 6, lines 38-39, please correct “the second optical channel module 305a” to read --the second optical channel module 305b--.

At column 9, line 49, please correct “adjusts” to --adjust--.

At column 10, line 6, please correct “the” to read --one--.

Signed and Sealed this

Twenty-third Day of September, 2008

JON W. DUDAS
*Director of the United States Patent and Trademark Office*